US012736731B2

(12) United States Patent
Liu et al.

(10) Patent No.: US 12,736,731 B2
(45) Date of Patent: Sep. 15, 2026

(54) VISUAL OPTICAL SYSTEM

(71) Applicant: ZHEJIANG SUNNY OPTICS CO., LTD, Yuyao City (CN)

(72) Inventors: Huan Liu, Yuyao City (CN); Xiaobin Zhang, Yuyao City (CN); Lin Huang, Yuyao City (CN); Yinfang Jin, Yuyao City (CN); Liefeng Zhao, Yuyao City (CN)

(73) Assignee: ZHEJIANG SUNNY OPTICS CO., LTD., Yuyao City (CN)

( * ) Notice: Subject to any disclaimer, the term of this patent is extended or adjusted under 35 U.S.C. 154(b) by 215 days.

(21) Appl. No.: 18/776,407

(22) Filed: Jul. 18, 2024

(65) Prior Publication Data

US 2025/0314814 A1 Oct. 9, 2025

(30) Foreign Application Priority Data

Apr. 9, 2024 (CN) ......................... 202410425028.3

(51) Int. Cl.

*G02B 5/30* (2006.01)
*G02B 9/62* (2006.01)
*G02B 9/64* (2006.01)
*G02B 25/00* (2006.01)
*G02B 27/00* (2006.01)
*G02B 27/01* (2006.01)
*G02B 13/18* (2006.01)

(52) U.S. Cl.

CPC ......... *G02B 5/3025* (2013.01); *G02B 5/3083* (2013.01); *G02B 9/62* (2013.01); *G02B 9/64* (2013.01); *G02B 25/001* (2013.01); *G02B 27/0093* (2013.01); *G02B 27/0172* (2013.01); *G02B 13/18* (2013.01)

(58) Field of Classification Search

None

See application file for complete search history.

(56) References Cited

U.S. PATENT DOCUMENTS 11,803,062 B1 * 10/2023 Huang ..................... G02B 9/12
2020/0150384 A1 * 5/2020 Xu ........................... G02B 9/62
2020/0264411 A1 * 8/2020 Huang ............... G02B 27/0025

(Continued)

FOREIGN PATENT DOCUMENTS

CN 117008333 A 11/2023
CN 117008334 A 11/2023

*Primary Examiner* — Derek S. Chapel

(74) *Attorney, Agent, or Firm* — Sughrue Mion, PLLC

(57) ABSTRACT

A visual optical system comprises a first optical system and a second optical system. The first optical system comprises a first lens having a positive refractive power, a reflective polarizing element, a quarter-wave plate, a second lens having a refractive power and a third lens having a positive refractive power. The second optical system comprises, sequentially along a second optical axis from the first side to the second side, first to sixth lens elements. An effective focal length f3' of the third lens, a distance TD' from a first-side surface of the first lens to a second-side surface of the third lens on the first optical axis, an effective focal length f1 of the first lens element and a distance TD from a first-side surface of the first lens element to a second-side surface of the sixth lens element on the second optical axis satisfy: $1.9<(f3'/TD')/(|f1|/TD)<5.7$.

18 Claims, 8 Drawing Sheets

(56) References Cited

U.S. PATENT DOCUMENTS

| | | | | |
|---|---|---|---|---|
| 2024/0345380 | A1* | 10/2024 | Chen | G02B 25/001 |
| 2024/0369837 | A1* | 11/2024 | Chen | G02B 9/12 |
| 2025/0314856 | A1* | 10/2025 | Zhang | G02B 9/64 |
| 2025/0314899 | A1* | 10/2025 | Zhang | G02B 9/64 |

* cited by examiner

VISUAL OPTICAL SYSTEM

CROSS-REFERENCE TO RELATED APPLICATION

This application claims benefit of priority to Chinese Patent Application No. 202410425028.3 filed on Apr. 9, 2024 before the China National Intellectual Property Administration, the entire disclosure of which is incorporated herein by reference in its entity.

TECHNICAL FIELD

The present disclosure relates to the field of optical devices, and specifically to a visual optical system.

BACKGROUND

With the proposition of the concept of metaverse, virtual reality and augmented reality technologies for human-computer interaction have ushered in a second opportunity for development. As an important entrance to the human-computer interaction, a visual optical system plays a key role in the human-computer interaction. A traditional visual optical system generally includes an aspheric lens element or Fresnel lens element, and has problems such as a long body length, a heavy weight and a forward center of gravity, which will affect the user experience. In addition, the image resolution of the traditional visual optical system is poor.

SUMMARY

Embodiments of the present disclosure provide a visual optical system, for solving at least or in part one of the problems or other problems existing in existing technology.

According to a first aspect, implementations of the present disclosure provide a visual optical system. The visual optical system includes a first optical system and a second optical system; the first optical system comprises, sequentially along a first optical axis from a first side to a second side, a first lens having a positive refractive power, a reflective polarizing element, a quarter-wave plate, a second lens having a refractive power, and a third lens having a positive refractive power; and the second optical system comprises, sequentially along a second optical axis from the first side to the second side, a first lens element having a refractive power, a second lens element having a refractive power, a third lens element having a refractive power, a fourth lens element having a refractive power, a fifth lens element having a positive refractive power, and a sixth lens element having a refractive power; the number of lens elements included in the second optical system is 6; and an effective focal length f3' of the third lens, a distance TD' from a first-side surface of the first lens to a second-side surface of the third lens on the first optical axis, an effective focal length f1 of the first lens element, and a distance TD from a first-side surface of the first lens element to a second-side surface of the sixth lens element on the second optical axis satisfy: $1.9<(f3'/TD')/(|f1|/TD)<5.7$.

According to an implementation of the present disclosure, the effective focal length f3' of the third lens, a radius of curvature R6' of the second-side surface of the third lens, the effective focal length f1 of the first lens element, and a radius of curvature R1 of the first-side surface of the first lens element satisfy: $0.8<(f3'/R6')/(f1/R1)<-0.2$.

According to an implementation of the present disclosure, a refractive index N3' of the third lens, a refractive index N1 of the first lens element, and a total effective focal length f of the visual optical system satisfy: $1.1\ \text{mm}<(N3'/N1)\times f<1.8\ \text{mm}$.

According to an implementation of the present disclosure, an abbe number V3' of the third lens, an abbe number V1 of the first lens element, and an abbe number V2 of the second lens element satisfy: $0.4<V3'/(V1+V2)<1.5$.

According to an implementation of the present disclosure, an effective focal length f1' of the first lens and a radius of curvature R2' of a second-side surface of the first lens satisfy: $-2.4<f1'/R2'<-0.6$.

According to an implementation of the present disclosure, a radius of curvature R3' of a first-side surface of the second lens and an effective focal length f2' of the second lens satisfy: $0.4<R3'/f2'<0.8$.

According to an implementation of the present disclosure, a center thickness CT1' of the first lens on the first optical axis, a center thickness CTR of the reflective polarizing element on the first optical axis, a center thickness CTQ of the quarter-wave plate on the first optical axis, and the total effective focal length f of the visual optical system may satisfy: $2.1<(CT1'+CTR+CTQ)/f<3.8$.

According to an implementation of the present disclosure, a center thickness CT2' of the second lens on the first optical axis, a center thickness CT3' of the third lens on the first optical axis, and a total effective focal length f of the visual optical system satisfy: $4.9<(CT2'+CT3')/f<7.9$.

According to an implementation of the present disclosure, the distance TD' from the first-side surface of the first lens to the second-side surface of the third lens on the first optical axis and the center thickness CT3' of the third lens on the first optical axis may satisfy: $1.5<TD'/CT3'<2.2$.

According to an implementation of the present disclosure, an effective focal length f5 of the fifth lens element and the total effective focal length f of the visual optical system may satisfy: $0.5<f5/f<1.4$.

According to an implementation of the present disclosure, an effective focal length f4 of the fourth lens element and an effective focal length f2 of the second lens element may satisfy: $-1.7<f4/f2<-0.2$.

According to an implementation of the present disclosure, the radius of curvature R1 of the first-side surface of the first lens element and a radius of curvature R2 of the second-side surface of the first lens element may satisfy: $0.2<R1/R2<0.8$.

According to an implementation of the present disclosure, a radius of curvature R5 of the first-side surface of the third lens element and a radius of curvature R4 of the second-side surface of the second lens element may satisfy: $0.1<R5/R4<1.8$.

According to an implementation of the present disclosure, a center thickness CT4 of the fourth lens element on the second optical axis, an abbe number V4 of the fourth lens element, a center thickness CT5 of the fifth lens element on the second optical axis, and an abbe number V5 of the fifth lens element may satisfy: $0.1<(V4/V5)\times(CT4/CT5)<1.7$.

According to an implementation of the present disclosure, the distance TD from the first-side surface of the first lens element to the second-side surface of the sixth lens element on the second optical axis and the total effective focal length f of the visual optical system may satisfy: $1.0<TD/f<2.1$.

According to an implementation of the present disclosure, a radius of curvature R12 of the second-side surface of the sixth lens element and an effective focal length f6 of the sixth lens element may satisfy: $-0.8<R12/f6<-0.1$.

According to an implementation of the present disclosure, a display screen is provided at the second side of the visual optical system, and the second optical system is positioned between the first optical system and the display screen.

According to an implementation of the present disclosure, the angle θ between the second optical axis and the first optical axis satisfies: $0°<\theta<90°$.

The visual optical system provided in embodiments of the present disclosure is configured as a structure in the form of a combination of the first optical system and the second optical system. The focal lengths and distances of the lenses and/or lens elements in each optical system will directly affect the focusing and imaging quality of images. By constraining $(f3'/TD')/(|f1|/TD)$ within a certain range, on the one hand, the distortion and aberrations can be reduced to the greatest extent, which improves the clarity and contrast of the images, thereby improving the imaging quality of the visual optical system; on the other hand, the magnification and field-of-view of the visual optical system can be controlled and appropriately enlarged, thereby ensuring that the user has a clear and comfortable visual experience.

BRIEF DESCRIPTION OF THE DRAWINGS

After reading detailed descriptions of non-limiting embodiments given with reference to the following accompanying drawings, other features, objectives and advantages of the present disclosure will become more apparent. Here.

DETAILED DESCRIPTION OF EMBODIMENTS

Figure 1:
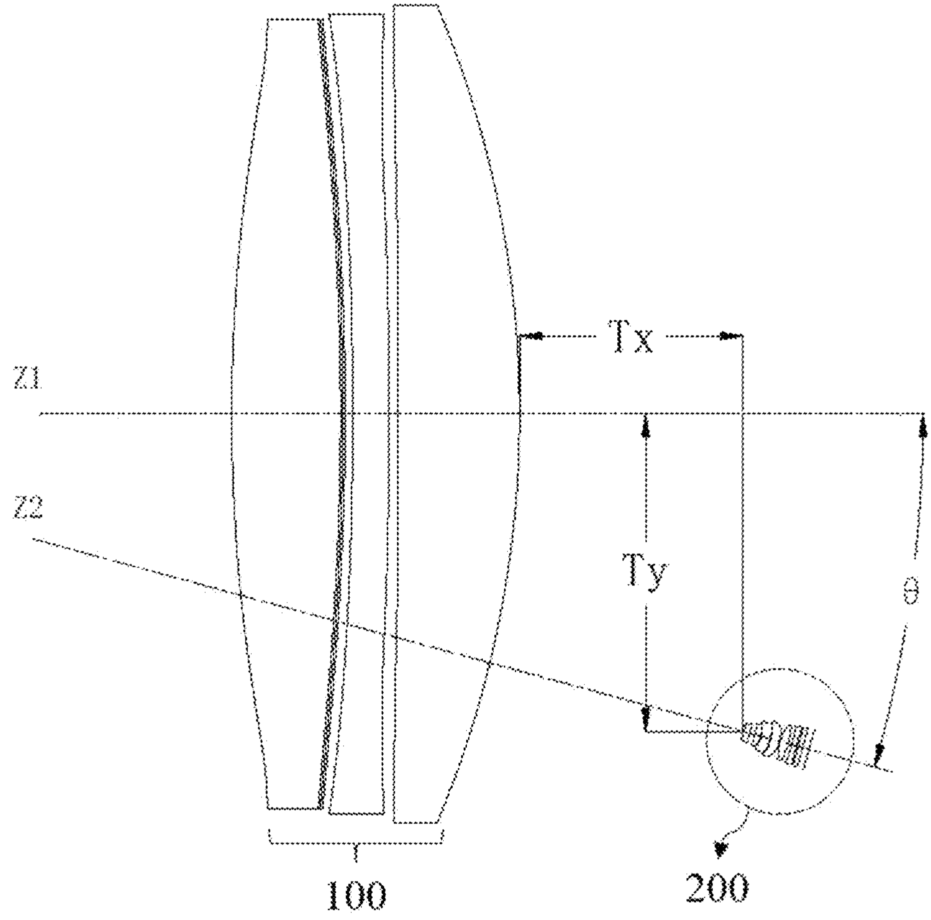
FIG. 1 is a schematic structural diagram of a visual optical system according to an embodiment of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements.

It should be noted that, in the specification, the expressions such as "first," "second" and "third" are only used to distinguish one feature from another, rather than represent any limitations to the features. Thus, the first lens/first lens element discussed below may also be referred to as the second lens/second lens element or the third lens/third lens element without departing from the teachings of the present disclosure.

In the accompanying drawings, the thicknesses, sizes and shapes of the lenses are slightly exaggerated for the convenience of explanation. Specifically, the shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens and/or lens element surface is a convex surface and the position of the convex surface is not defined, it represents that the lens and/or lens element surface is a convex surface at least at the paraxial area. If the lens and/or lens element surface is a concave surface and the position of the concave surface is not defined, it represents that the lens and/or lens element surface is a concave surface at least at the paraxial area. A surface of each lens and/or lens element that is closest to a first side (e.g., the side near the eye) is referred to as the first-side surface of the lens and/or lens element, and a surface of the each lens and/or lens element that is closest to a second side (e.g., the side away from the eye) is referred to as the second-side surface of the lens and/or lens element.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, the use of "may," when describing the implementations of the present disclosure, represents "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

Figure 2:
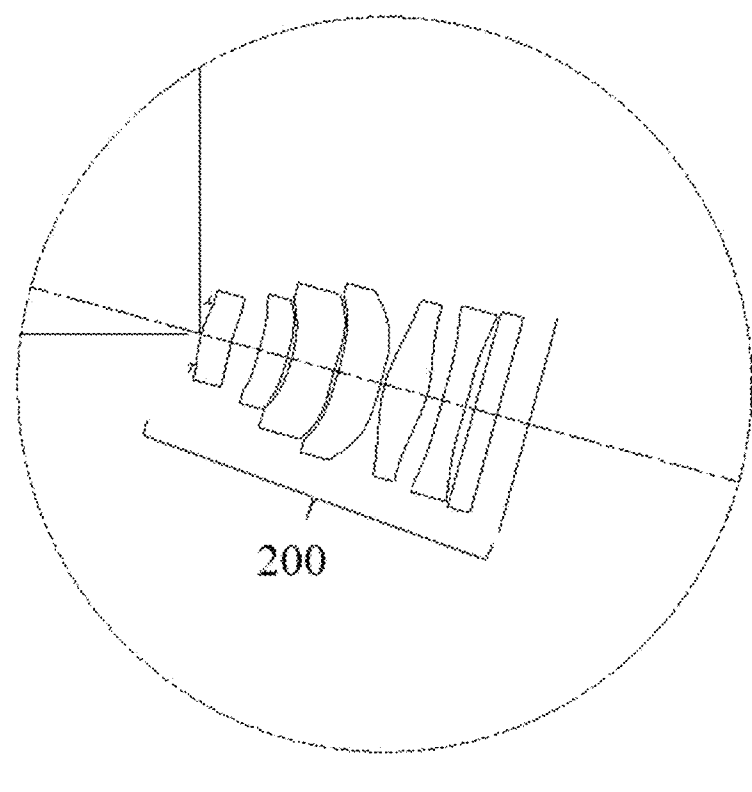
FIG. 2 is a schematic structural diagram of a second optical system according to an embodiment of the present disclosure.

Referring to FIGS. 1 and 2, a visual optical system is provided in a first aspect of the present disclosure, and the visual optical system may include a first optical system and a second optical system. The first optical system may be configured as a catadioptric optical system. The second optical system is used to collect an eye image of a user, and acquire the point-of-gaze information of a human eye according to the collected eye image, to realize an eye tracking function. The number of first optical systems may be one or more. The number of second optical systems may be one or more. In an example, the visual optical system may include two first optical systems and two second optical systems that are disposed symmetrically.

In an exemplary implementation, the first optical system may include a first lens, a reflective polarizing element, a quarter-wave plate, a second lens and a third lens that are arranged sequentially along a first optical axis (e.g., the Z1 axis) from a first side to a second side. The first optical system in embodiments of the present disclosure includes the three lenses, the reflective polarizing element and the quarter-wave plate. The polarization state of light changes after the light passes through the quarter-wave plate, and the light after the change of the polarization state is reflected or transmitted at the reflective polarizing element, such that the light is refracted and reflected between the first lens and the second lens or between the first lens and the third lens, thereby effectively shortening the body length of the first optical system.

In an exemplary implementation, the first lens may have a positive refractive power. The second lens may have a positive refractive power or a negative refractive power. The third lens may have a positive refractive power.

In an exemplary implementation, the reflective polarizing element is attached to the quarter-wave plate and attached to a second-side surface of the first lens. Here, the reflective polarizing element is closer to the second-side surface of the first lens than the quarter-wave plate. By combining the reflective polarizing element and the quarter-wave plate together to form a film layer, the number of attached surfaces of the film layer can be reduced, thereby improving the attachment yield of the film layer.

In an exemplary implementation, the first optical system may further include a partially reflective layer. The partially reflective layer may be attached to a first-side surface or second-side surface of the second lens, or the partially reflective layer may be attached to a first-side surface or second-side surface of the third lens. The partially reflective layer has a semi-transmissive and semi-reflective effect on light. By disposing the partially reflective layer, and in combination with the reflective polarizing element and the quarter-wave plate, it is possible to refract and reflect the light many times, thereby effectively reducing the body length of the first optical system.

In an exemplary implementation, the second optical system may include a first lens element, a second lens element, a third lens element, a fourth lens element, a fifth lens element and a sixth lens element that are arranged sequentially along a second optical axis (e.g., the Z2 axis) from the first side to the second side. There may be an air spacing between two adjacent lens elements in the first to sixth lens elements.

In an exemplary implementation, the first lens element may have a positive refractive power or a negative refractive power, a first-side surface of the first lens element may be a convex surface or a concave surface, and a second-side surface of the first lens element may be a convex surface or a concave surface.

In an exemplary implementation, the second lens element may have a positive refractive power or a negative refractive power, a first-side surface of the second lens element may be a convex surface or a concave surface, and a second-side surface of the second lens element may be a convex surface or a concave surface.

In an exemplary implementation, the third lens element may have a positive refractive power or a negative refractive power, a first-side surface of the third lens element may be a convex surface or a concave surface, and a second-side surface of the third lens element may be a convex surface or a concave surface.

In an exemplary implementation, the fourth lens element may have a positive refractive power or a negative refractive power, a first-side surface of the fourth lens element may be a concave surface, and a second-side surface of the fourth lens element may be a convex surface.

In an exemplary implementation, the fifth lens element may have a positive refractive power, a first-side surface of the fifth lens element may be a convex surface, and a second-side surface of the fifth lens element may be a convex surface or a concave surface.

In an exemplary implementation, the sixth lens element may have a positive refractive power or a negative refractive power, a first-side surface of the sixth lens element may be a convex surface or a concave surface, and a second-side surface of the sixth lens element may be a convex surface or a concave surface.

In an exemplary implementation, the first side may refer to the side near the eye and the second side may refer to the side away from the eye. Accordingly, a first-side surface of each element (the first lens, the second lens, the third lens, the reflective polarizing element, the quarter-wave plate, the first lens element, the second lens element, the third lens element, the fourth lens element, the fifth lens element and the sixth lens element) may be referred to as a near-eye-side surface, and a second-side surface of the each element may be referred to as an away-from-eye-side surface.

In an exemplary implementation, the second optical system is positioned at a side of the first optical system that is away from a human eye. For example, there may be a display screen disposed at the second side of the visual optical system, and the second optical system is positioned between the first optical system and the display screen. Light from the human eye passes through the first optical system and then reaches the second optical system, and the second optical system receives the light and presents an image. By placing the second optical system on the side of the first optical system that is away from the human eye, it is possible to make the visual optical system have an eye tracking function under the premise of not affecting the performance and function of the first optical system. Moreover, it is possible to improve the appearance of the subsequent apparatus including the visual optical system, and make the second optical system invisible to human eyes, thereby improving the aesthetics of the apparatus.

In an exemplary implementation, the angle θ between the second optical axis and the first optical axis may satisfy:

$0°<\theta<90°$. By controlling the angle between the second optical axis and the first optical axis, the second optical system can be placed outside the first optical system, which can enable the second optical system to capture an eye image while ensuring the performance and function of the first optical system, thereby realizing the eye tracking function.

In an exemplary implementation, the second optical system may further include a diaphragm, and the diaphragm may be disposed between the first optical system and the first lens element.

In an exemplary implementation, a spacing distance Tx from an intersection point of the second-side surface of the third lens in the first optical system and the first optical axis to an intersection point of a center of the diaphragm and the second optical axis along the direction of the first optical axis may satisfy: $0\ mm \le Tx < 15.0\ mm$. By controlling the distance between the second optical system and the first optical system in the x directional, the second optical system can be effectively constrained to be positioned between the first optical system and the display screen, thereby ensuring the feasibility of an eye tracking scheme.

In an exemplary implementation, a spacing distance Ty from the intersection point of the second-side surface of the third lens in the first optical system and the first optical axis to the intersection point of the center of the diaphragm and the second optical axis along a direction perpendicular to the first optical axis may satisfy: $5\ mm \le Ty < 25.0\ mm$. By controlling the distance between the second optical system and the first optical system in the y direction, the aperture of a bracket used to support the second optical system can be effectively constrained, and the aperture of the bracket can be made between the aperture of the first optical system and the display screen in size, which is conducive to the assembling of the second optical system.

In an exemplary implementation, an effective focal length f3' of the third lens, a distance TD' from a first-side surface of the first lens to the second-side surface of the third lens on the first optical axis, an effective focal length f1 of the first lens element, and a distance TD from the first-side surface of the first lens element to the second-side surface of the sixth lens element on the second optical axis may satisfy: $1.9<(f3'/TD')/(|f1|/TD)<5.7$. The visual optical system provided in embodiments of the present disclosure is configured as a structure in the form of a combination of the first optical system and the second optical system. The focal lengths and distances of the lenses and/or lens elements in each optical system will directly affect the focusing and imaging quality of images. By constraining $(f3'/TD')/(|f1|/TD)$ within a certain range, on the one hand, the distortion and aberrations can be reduced to the greatest extent, which improves the clarity and contrast of the images, thereby improving the imaging quality of the visual optical system; on the other hand, the magnification and field-of-view of the visual optical system can be controlled and appropriately enlarged, thereby ensuring that the user has a clear and comfortable visual experience. If the numerical value of $(f3'/TD')/(|f1|/TD)$ is too small (e.g., when $(f3'/TD')/(|f1|/TD) \le 1.9$), the imaging quality of the visual optical system will deteriorate, affecting the visual experience of the user.

In an exemplary implementation, the effective focal length f3' of the third lens, a radius of curvature R6' of the second-side surface of the third lens, the effective focal length f1 of the first lens element and a radius of curvature R1 of the first-side surface of the first lens element may satisfy: $-0.8<(f3'/R6')/(f1/R1)<-0.2$. By satisfying the above conditional expression, the ratio of the focal length of the third lens in the first optical system to the focal length of the first lens element in the second optical system can be made appropriate, which ensures the propagation and focusing effects of light in the visual optical system, thereby improving the imaging quality and clarity of the visual optical system. If the above ratio is too small, the light will be overly defocused, resulting in a blurred image. If the ratio is too large, the light will be overly concentrated, which leads to the over-focusing of an image, resulting in problems such as aberrations and distortion. By limiting the above ratio within a reasonable range, the light can remain focused moderately, thereby providing clear and accurate images.

In an exemplary implementation, a refractive index N3' of the third lens, a refractive index N1 of the first lens element, and a total effective focal length f of the visual optical system may satisfy: $1.1\ mm<(N3'/N1)\times f<1.8\ mm$. By satisfying the above conditional expression, the total effective focal length of the visual optical system can be constrained within a reasonable range, which makes the visual optical system obtain a good imaging quality at a certain refractive index. By reasonably selecting the refractive indices and the focal length, light can be made focused or scattered better, which reduces the aberrations and distortion, thereby improving the clarity and accuracy of the visual optical system in imaging; meanwhile, it can be ensured that the focus position of the visual optical system remains relatively stable within an acceptable range, thereby providing users with a better observation experience and avoiding the problem of occurrence of blurred or unclear images. In addition, the visual optical system has a small focal length range, which simplifies the optical design and manufacturing process, reduces material and processing costs and improves the production efficiency.

In an exemplary implementation, an abbe number V3' of the third lens, an abbe number V1 of the first lens element, and an abbe number V2 of the second lens element may satisfy: $0.4<V3'/(V1+V2)<1.5$. By satisfying the above conditional expression, the focusing effect and dispersion characteristic of light can be controlled, thereby enhancing the performance and function of the visual optical system; meanwhile, the chromatic aberrations of the visual optical system can also be constrained, and the dispersion effect of the visual optical system can be reduced, thereby improving the imaging quality of the visual optical system.

In an exemplary implementation, an effective focal length f1' of the first lens and a radius of curvature R2' of the second-side surface of the first lens may satisfy: $-2.4<f1'/R2'<-0.6$. By constraining the ratio of the effective focal length of the first lens to the radius of curvature of the second-side surface of the first lens within a reasonable range, it is possible to ensure that light is focused in the best manner during the process of being refracted and reflected by the reflective polarizing element at the second-side surface of the first lens, thereby improving the clarity and quality of the image formed by the visual optical system and optimizing the performance of the visual optical system.

In an exemplary implementation, a radius of curvature R3' of the first-side surface of the second lens and an effective focal length f2' of the second lens may satisfy: $0.4<R3'/f2'<0.8$. By constraining the ratio of the radius of curvature of the first-side surface of the second lens to the effective focal length of the second lens within a reasonable range, light can be focused on the focal plane of the visual optical system, which reduces aberrations, thereby improving the imaging quality of the image formed by the visual optical system; meanwhile, the luminous flux of the visual optical system can be optimized, thereby improving the sensitivity and light transmittance of the visual optical system.

In an exemplary implementation, a center thickness CT1' of the first lens on the first optical axis, a center thickness CTR of the reflective polarizing element on the first optical axis, a center thickness CTQ of the quarter-wave plate on the first optical axis, and the total effective focal length f of the visual optical system may satisfy: $2.1<(CT1'+CTR+CTQ)/f<3.8$. By satisfying the above conditional expression, the imaging performance of the visual optical system can be optimized, and the optical elements such as the first lens, the reflective polarizing element and the quarter-wave plate can be made more compact in design, which helps to reduce the size and weight of the visual optical system, making it lighter and easier to carry; meanwhile, the risks of interference and collision between optical elements can also be reduced, which helps to improve the reliability and durability of the visual optical system and reduce the possibility of damage and failure of the visual optical system.

In an exemplary implementation, a center thickness CT2' of the second lens on the first optical axis, a center thickness CT3' of the third lens on the first optical axis, and the total effective focal length f of the visual optical system may satisfy: $4.9<(CT2'+CT3')/f<7.9$. The aperture and volume of the first optical system are much larger than those of the second optical system. By satisfying the above conditional expression, the second lens and the third lens can be made more compact in design, which helps to reduce the size and weight of the first optical system; meanwhile, the aberrations and distortion can also be reduced, which improves the clarity and accuracy of the image formed by the visual optical system, thereby optimizing the imaging performance of the visual optical system.

In an exemplary implementation, the distance TD' from the first-side surface of the first lens to the second-side surface of the third lens on the first optical axis and the center thickness CT3' of the third lens on the first optical axis may satisfy: $1.5<TD'/CT3'<2.2$. By satisfying the above conditional expression, the size and weight of the visual optical system can be reduced, which makes it lighter and easier to carry, thereby achieving the compactness and lightness of the visual optical system; meanwhile, the aberrations can also be reduced, thereby improving the imaging quality and clarity of the visual optical system. In addition, the above conditional expression is helpful for the optimization and design of the visual optical system, and is helpful for the determination of the optimal structure under the premise of meeting the requirement of the visual optical system, which makes the performance of the visual optical system reach the best state.

In an exemplary implementation, an effective focal length f5 of the fifth lens element and the total effective focal length f of the visual optical system may satisfy: $0.5<f5/f<1.4$. By constraining the ratio of the effective focal length of the fifth lens element to the total effective focal length of the visual optical system within a reasonable range, it is possible to increase the width of the field of the visual optical system, which helps the user to more comprehensively observe and perceive the surrounding environment; meanwhile, it is also possible to increase the depth of field of the visual optical system, which makes the visual optical system clearly present both close and distant objects at the same time, thereby improving the observation effect.

In an exemplary implementation, an effective focal length f4 of the fourth lens element and an effective focal length f2 of the second lens element may satisfy: $-1.7<f4/f2<-0.2$. By constraining the ratio of the effective focal length of the fourth lens element to the effective focal length of the second lens element within a reasonable range, it is possible to make the visual optical system have an appropriate field-of-view and magnification, thereby avoiding the problem of loss of details due to excessive magnification and the problem of poor observation effect due to insufficient magnification; meanwhile, it helps the visual optical system to obtain a wider field-of-view, providing the user with a more realistic visual experience.

In an exemplary implementation, the radius of curvature R1 of the first-side surface of the first lens element and a radius of curvature R2 of the second-side surface of the first lens element may satisfy: $0.2<R1/R2<0.8$. By constraining the ratio of the radius of curvature of the first-side surface of the first lens element to the radius of curvature of the second-side surface of the first lens element within a reasonable range, it is possible to avoid that the shape of the first lens element is too flat or too steep, which reduces aberrations and optical distortion, thereby improving the clarity and accuracy of the visual optical system in imaging, and it is possible to reduce the difficulty of processing the first lens element while meeting the requirement for light convergence.

In an exemplary implementation, a radius of curvature R5 of the first-side surface of the third lens element and a radius of curvature R4 of the second-side surface of the second lens element may satisfy: $0.1<R5/R4<1.8$. By constraining the ratio of the radius of curvature of the first-side surface of the third lens element to the radius of curvature of the second-side surface of the second lens element within a reasonable range, it is possible to maintain the focusing effect of light and reduce the aberrations and distortion, thereby improving the imaging quality of the visual optical system; meanwhile, it is also possible to make the visual optical system have an appropriate magnification, thereby ensuring that the user has a clear and comfortable visual experience.

In an exemplary implementation, a center thickness CT4 of the fourth lens element on the second optical axis, an abbe number V4 of the fourth lens element, a center thickness CT5 of the fifth lens element on the second optical axis, and an abbe number V5 of the fifth lens element may satisfy: $0.1<(V4/V5)\times(CT4/CT5)<1.7$. By satisfying the above conditional expression, the ratio of the abbe number of the fourth lens element to the abbe number of the fifth lens element can be constrained within a reasonable range, which effectively constrains the chromatic aberrations of the visual optical system and reduces the dispersion effect, thereby improving the imaging quality of the visual optical system; meanwhile, the ratio of the center thickness of the fourth lens element to the center thickness of the fifth lens element can be constrained within a reasonable range, which ensures that the center thicknesses of the lens elements match other optical parameters, thereby reducing the volume and weight of the visual optical system.

In an exemplary implementation, the distance TD from the first-side surface of the first lens element to the second-side surface of the sixth lens element on the second optical axis and the total effective focal length f of the visual optical system may satisfy: $1.0<TD/f<2.1$. By satisfying the above conditional expression, the overall size of the second optical system can be made relatively small, which facilitates the integration and installation of the second optical system; meanwhile, the optical distortion and aberrations inside the visual optical system can be reduced, which improves the performance stability of the visual optical system.

In an exemplary implementation, a radius of curvature R12 of the second-side surface of the sixth lens element and an effective focal length f6 of the sixth lens element may satisfy: $-0.8<R12/f6<-0.1$. By constraining the ratio of the radius of curvature of the second-side surface of the sixth lens element to the effective focal length of the sixth lens element within a reasonable range, it is possible to select the shape and position of the sixth lens element reasonably, to reduce the aberrations (especially the spherical aberrations and the coma) of the visual optical system to the greatest extent, thereby improving the imaging quality of the visual optical system; meanwhile, it is also conducive to designing a more stable visual optical system to ensure that the visual optical system has good imaging performance within different working distance ranges, and thus the aberrations will not increase due to a change of the focal length.

The visual optical system according to the above implementations of the present disclosure may include the first optical system and the second optical system. Here, the first optical system may adopt a plurality of lenses, for example, the three lenses described above. The second optical system may adopt a plurality of lenses, for example, the six lens elements described above. By reasonably configuring the parameters of the first optical system and the second optical system, the imaging quality of the visual optical system can be improved, and the visual optical system can have an appropriate magnification and field-of-view to ensure that the user has a clear and comfortable visual experience. The visual optical system configured as above has the characteristics such as miniaturization and a good imaging quality, and thus can well meet the using demands of various portable electronic products in projection scenarios. Moreover, the center of gravity of the visual optical system and the center of gravity of the device including the visual optical system are moved backward, thereby improving the user experience.

In the implementations of the present disclosure, at least one of the surfaces of each lens in the first to third lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Similarly, at least one of the surfaces of each lens element in the first to sixth lens elements is an aspheric surface.

However, it should be understood by those skilled in the art that the various results and advantages described in the present specification may be obtained by changing the number of the lenses and/or the number of the lens elements without departing from the technical solution claimed by the present disclosure.

Referring to FIGS. 1 and 2, a visual optical system is provided in a second aspect of the present disclosure, and the visual optical system may include a first optical system and a second optical system. The first optical system includes, sequentially along a first optical axis from a first side to a second side, a first lens having a positive refractive power, a reflective polarizing element, a quarter-wave plate, a second lens having a refractive power and a third lens having a positive refractive power. The second optical system includes, sequentially along a second optical axis from the first side to the second side, a first lens element having a refractive power, a second lens element having a refractive power, a third lens element having a refractive power, a fourth lens element having a refractive power, a fifth lens element having a positive refractive power and a sixth lens element having a refractive power. The number of lens elements having a refractive power in the second optical system is 6.

Here, an effective focal length f3' of the third lens, a radius of curvature R6' of a second-side surface of the third lens, an effective focal length f1 of the first lens element, and a radius of curvature R1 of a first-side surface of the first lens element may satisfy: $-0.8<(f3'/R6')/(f1/R1)<-0.2$. The visual optical system provided in embodiments of the present disclosure is configured as a structure in the form of a combination of the first optical system and the second optical system. By constraining $(f3'/R6')/(f1/R1)$ within a certain range, the ratio of the focal length of the third lens in the first optical system to the focal length of the first lens element in the second optical system can be appropriately made to ensure the propagation and focusing effects of light in the visual optical system, thereby improving the imaging quality and clarity of the visual optical system. If the above ratio is too small, the light will be overly defocused, resulting in a blurred image. If the ratio is too large, the light will be overly concentrated, which leads to the over-focusing of an image, resulting in problems such as aberrations and distortion. By limiting the above ratio within a reasonable range, the light can remain focused moderately, thereby providing clear and accurate images.

Detailed embodiments of the visual optical system that may be applicable to the above implementations are further described below with reference to the accompanying drawings.

Embodiment 1

Figure 3:
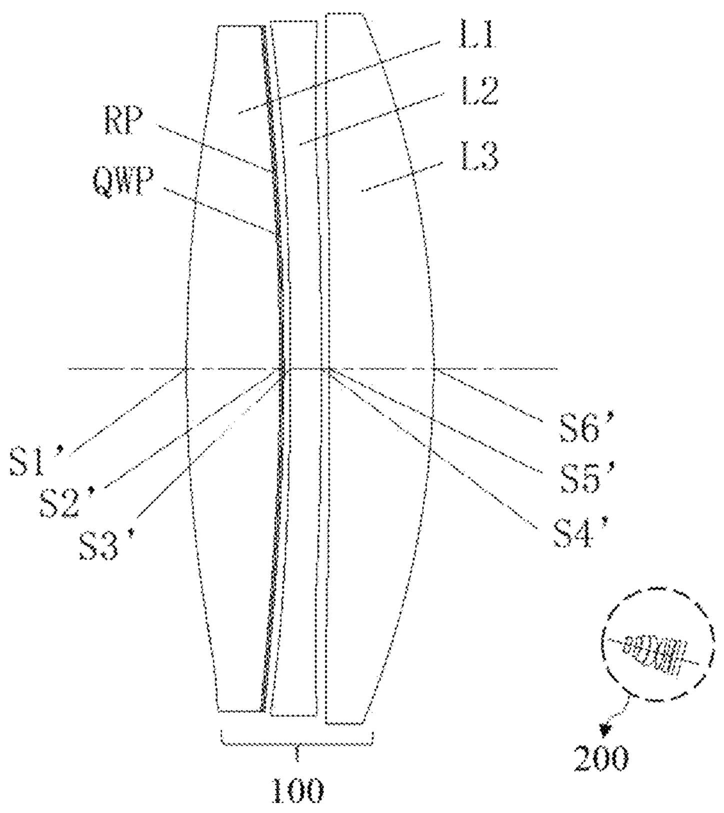
FIG. 3 is a schematic structural diagram of a visual optical system according to Embodiment 1 of the present disclosure.
Figure 4:
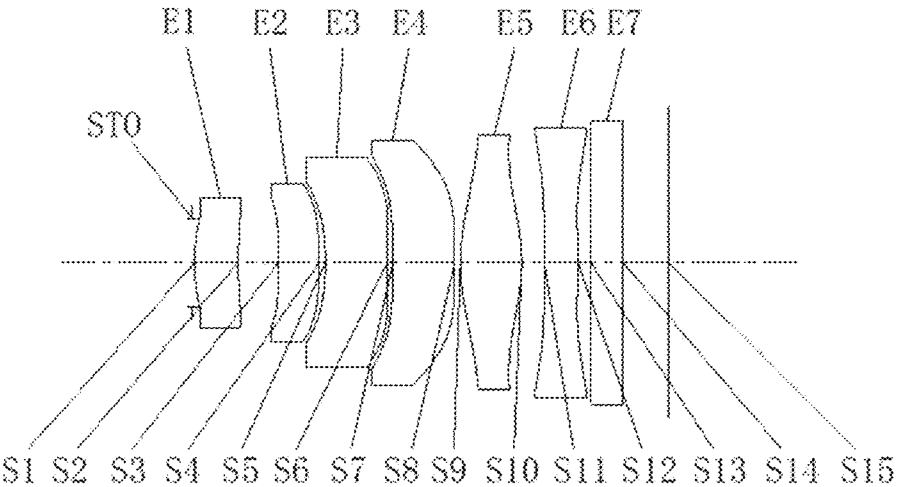
FIG. 4 is a schematic structural diagram of a second optical system according to Embodiment 1 of the present disclosure.
Figure 5:
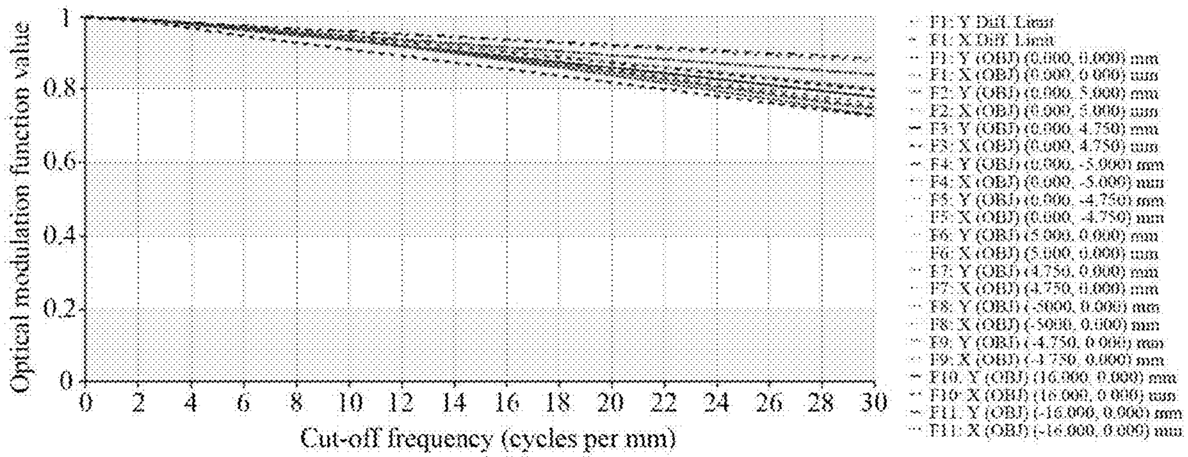
FIG. 5 illustrates a modulation transfer function curve of the visual optical system according to Embodiment 1 of the present disclosure.

A visual optical system according to Embodiment 1 of the present disclosure is described below with reference to FIGS. 3-5. FIG. 3 is a schematic structural diagram of the visual optical system in Embodiment 1. FIG. 4 is a schematic structural diagram of a second optical system in Embodiment 1. FIG. 5 illustrates a modulation transfer function (MTF) curve of the visual optical system in Embodiment 1.

As shown in FIGS. 3 and 4, the visual optical system may include the first optical system 100 and the second optical system 200, the second optical system 200 being positioned on a side of the first optical system 100 that is away from the human eye. The first optical system 100 includes, sequentially along a first optical axis from the near-eye side to the away-from-eye side, a first lens L1, a reflective polarizing element RP, a quarter-wave plate QWP, a second lens L2 and a third lens L3. The first optical system 100 may further be provided with a partially reflective layer provided on one side surface of the second lens L2 or the third lens L3. The second optical system 200 includes, sequentially along a second optical axis from the near-eye side to the away-from-eye side, a first lens element E1, a second lens element E2, a third lens element E3, a fourth lens element E4, a fifth lens element E5 and a sixth lens element E6. A diaphragm STO may be disposed between the first optical system 100 and the first lens element E1.

Here, the first lens L1 has a positive refractive power, the near-eye-side surface S1' of the first lens L1 is a convex surface, and the away-from-eye-side surface S2' of the first lens L1 is a convex surface. The reflective polarizing element RP has a near-eye-side surface and an away-from-eye-side surface, and the near-eye-side surface of the reflective polarizing element RP is attached to the away-from-eye-side surface S2' of the first lens L1. The quarter-wave plate QWP has a near-eye-side surface and an away-from-eye-side surface, and the near-eye-side surface of the quarter-wave plate QWP is attached to the away-from-eye-side surface of the reflective polarizing element RP. The second lens L2 has a negative refractive power, a near-eye-side surface S3' of the second lens L2 is a concave surface, and an away-from-eye-side surface S4' of the second lens L2 is a convex surface. The third lens L3 has a positive refractive power, a near-eye-side surface S5' of the third lens L3 is a convex surface, and an away-from-eye-side surface S6' of the third lens L3 is a convex surface.

Here, the first lens element E1 has a positive refractive power, a near-eye-side surface S1 of the first lens element E1 is a convex surface, and a away-from-eye-side surface S2 of the first lens element E1 is a concave surface. The second lens element E2 has a positive refractive power, a near-eye-side surface S3 of the second lens element E2 is a concave surface, and a away-from-eye-side surface S4 of the second lens element E2 is a convex surface. The third lens element E3 has a negative refractive power, a near-eye-side surface S5 of the third lens element E3 is a concave surface, and an away-from-eye-side surface S6 of the third lens element E3 is a concave surface. The fourth lens element E4 has a negative refractive power, a near-eye-side surface S7 of the fourth lens element E4 is a concave surface, and an away-from-eye-side surface S8 of the fourth lens element E4 is a convex surface. The fifth lens element E5 has a positive refractive power, a near-eye-side surface S9 of the fifth lens element E5 is a convex surface, and an away-from-eye-side surface S10 of the fifth lens element E5 is a convex surface. The sixth lens element E6 has a positive refractive power, a near-eye-side surface S11 of the sixth lens element E6 is a convex surface, and an away-from-eye-side surface S12 of the sixth lens element E6 is a convex surface. An optical filter E7 has a near-eye-side surface S13 and an away-from-eye-side surface S14. Light from an object sequentially passes through the surfaces S1-S14, and finally forms an image on an image plane S15.

Table 1 is a table showing basic parameters of the visual optical system in Embodiment 1. Here, the units of a radius of curvature and a thickness/distance are millimeters (mm).

TABLE 1

| surface number | surface type | radius of curvature | thickness/ distance | material: refractive index | material: abbe number | conic coefficient |
|---|---|---|---|---|---|---|
| near-eye side | spherical | infinite | 12.0000 | | | |
| S1' | aspheric | 78.2443 | 5.6495 | 1.536 | 55.92 | 0.0000 |
| S2'/RP | aspheric | −133.9283 | 0.1000 | 1.490 | 56.00 | 0.0000 |
| QWP | aspheric | −133.9283 | 0.1000 | 1.490 | 56.00 | |
| | aspheric | −133.9283 | 0.2605 | | | |
| S3' | aspheric | −200.0000 | 1.4997 | 1.536 | 55.92 | 0.0000 |
| S4' | aspheric | −1055.3909 | 0.2500 | | | 0.0000 |
| S5' | aspheric | 897.7500 | 7.1657 | 1.536 | 55.92 | 0.0000 |
| S6' | aspheric | −47.3077 | 0.0000 Tx/Ty | | | 0.0000 |
| STO | spherical | infinite | 0.0132 | | | |
| S1 | aspheric | 1.3176 | 0.2893 | 1.647 | 19.24 | 0.0000 |
| S2 | aspheric | 3.6026 | 0.2673 | | | 0.0000 |
| S3 | aspheric | −44.8349 | 0.2704 | 1.647 | 19.24 | 0.0000 |
| S4 | aspheric | −3.1721 | 0.0414 | | | 0.0000 |
| S5 | aspheric | −2.1973 | 0.4070 | 1.537 | 56.14 | 0.0000 |
| S6 | aspheric | 2.2989 | 0.0432 | | | 0.0000 |
| S7 | aspheric | −5.3790 | 0.4096 | 1.647 | 19.24 | 0.0000 |
| S8 | aspheric | −90.6838 | 0.0323 | | | 0.0000 |
| S9 | aspheric | 1.2853 | 0.4177 | 1.647 | 19.24 | −1.0000 |
| S10 | aspheric | −1.1302 | 0.1373 | | | −1.0000 |
| S11 | aspheric | 44.0071 | 0.2213 | 1.647 | 19.24 | 0.0000 |
| S12 | aspheric | −3.9966 | 0.0800 | | | 0.0000 |
| S13 | spherical | infinite | 0.2100 | 1.510 | 64.17 | |
| S14 | spherical | infinite | 0.2979 | | | |
| S15 | spherical | infinite | 0.0000 | | | |

In this embodiment, the near-eye-side surfaces and the away-from-eye-side surfaces of the first to third lenses L1-L3 and the near-eye-side surfaces and the away-from-eye-side surfaces of the first to sixth lens elements E1-E6 are all aspheric surfaces, and the surface type x of each aspheric lens may be defined using, but not limited to, the following formula:

$$x = \frac{ch^2}{1 + \sqrt{1 - (k+1)c^2h^2}} + \sum Aih^i. \quad (1)$$

Here, X is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 2 shows the high-order coefficients $A_4$, $A_6$, $A_8$, $A_{10}$, $A_{12}$, $A_{14}$ and $A_{16}$ applicable to the aspheric surfaces S1'-S6' and S1-S12 in Embodiment 1.

TABLE 2

| surface number | $A_4$ | $A_6$ | $A_8$ | $A_{10}$ | $A_{12}$ | $A_{14}$ | $A_{16}$ |
|---|---|---|---|---|---|---|---|
| S1' | −2.3507E−01 | −7.2111E−02 | −4.9613E−02 | −5.2795E−04 | −7.3031E−03 | 1.7584E−04 | −4.7630E−04 |
| S2' | 1.6857E−01 | 1.5702E−02 | 1.5198E−03 | −6.4110E−04 | −2.8373E−03 | 1.3518E−04 | 1.1613E−04 |
| S3' | −4.4543E−01 | 2.4933E−02 | −1.3528E−03 | 2.6530E−03 | −7.6516E−03 | 1.9565E−03 | 1.7073E−03 |
| S4' | −2.3022E−01 | 1.5647E−01 | −2.4706E−01 | 3.1457E−02 | −3.8328E−04 | −9.1639E−03 | 2.8351E−03 |
| S5' | −6.4525E−01 | 1.5977E−01 | −1.1449E−01 | 1.5670E−02 | 6.5357E−03 | −4.8091E−03 | 1.2567E−03 |
| S6' | 6.3214E−03 | −1.1485E−02 | −1.2245E−03 | 0.0000E+00 | 0.0000E+00 | 0.0000E+00 | 0.0000E+00 |
| S1 | 5.0688E−03 | −6.0934E−04 | −4.0790E−04 | −7.8651E−05 | −3.7557E−05 | −6.4860E−05 | 4.8073E−06 |
| S2 | −4.4286E−03 | −6.6006E−04 | −7.2816E−04 | 5.3326E−05 | 1.0659E−04 | −1.6009E−04 | 7.1455E−05 |
| S3 | −1.2387E−01 | −8.9858E−03 | −2.6686E−03 | 1.4662E−04 | −6.7444E−05 | 3.6904E−05 | 5.0253E−05 |
| S4 | −1.5765E−01 | −2.0748E−03 | 3.7825E−03 | 8.4722E−04 | 5.8198E−04 | −1.0767E−04 | 5.5427E−06 |
| S5 | −1.4033E−01 | 5.3465E−02 | −7.5201E−03 | −8.6254E−04 | −6.0410E−04 | 5.6189E−04 | −1.6884E−04 |
| S6 | −5.9179E−01 | 7.0511E−02 | −1.6283E−02 | 6.8067E−03 | 1.1684E−04 | 6.3737E−04 | −8.1212E−04 |
| S7 | −2.9265E−01 | 2.4697E−02 | −3.8755E−03 | −3.7327E−03 | 2.9478E−03 | −9.6095E−04 | −6.2705E−04 |
| S8 | −5.5872E−01 | 1.3173E−01 | −9.7103E−03 | −5.2552E−03 | −8.2937E−05 | 2.7300E−04 | 1.7174E−04 |
| S9 | −1.1477E+00 | 2.6217E−01 | −3.7272E−02 | 3.4474E−03 | −4.3697E−03 | 2.0524E−03 | −1.3355E−03 |
| S10 | 1.4615E+00 | −3.9536E−01 | 1.2095E−01 | −2.4176E−02 | 3.5723E−03 | −4.4561E−03 | 2.7185E−04 |
| S11 | −1.4424E−01 | 9.9101E−02 | −8.1814E−02 | 3.4006E−02 | −1.1997E−02 | 1.5923E−03 | 2.1718E−03 |
| S12 | 5.1949E−01 | −2.3506E−01 | 1.4105E−01 | −7.3265E−02 | 2.5695E−02 | −1.0380E−02 | 6.0287E−03 |

Embodiment 2

Figure 6:
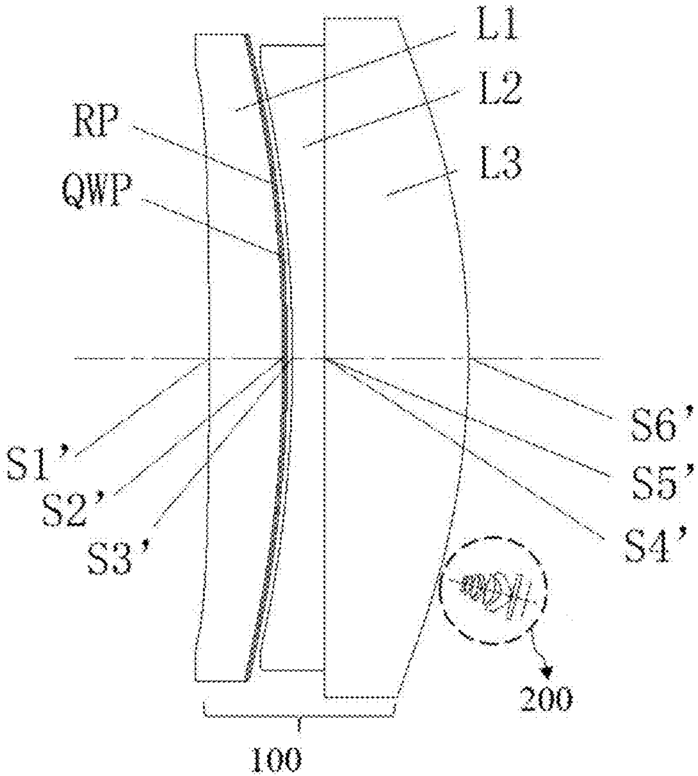
FIG. 6 is a schematic structural diagram of a visual optical system according to Embodiment 2 of the present disclosure.
Figure 7:
FIG. 7 is a schematic structural diagram of a second optical system according to Embodiment 2 of the present disclosure.
Figure 7:
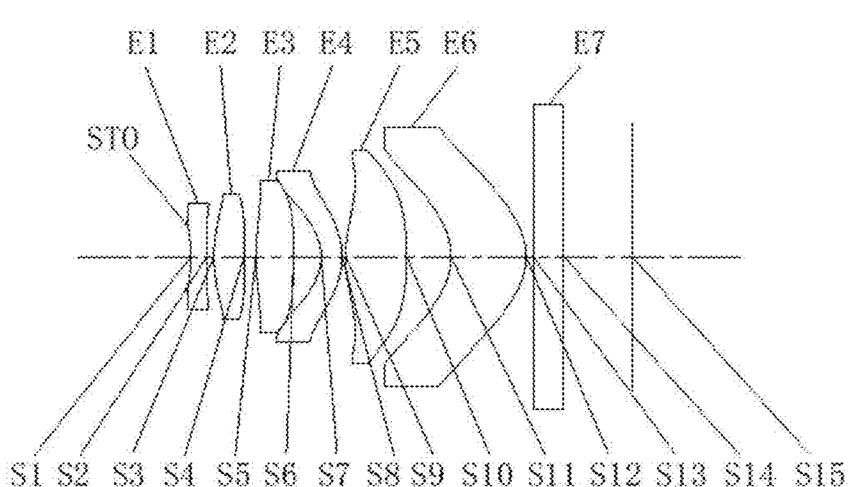
Figure 8:
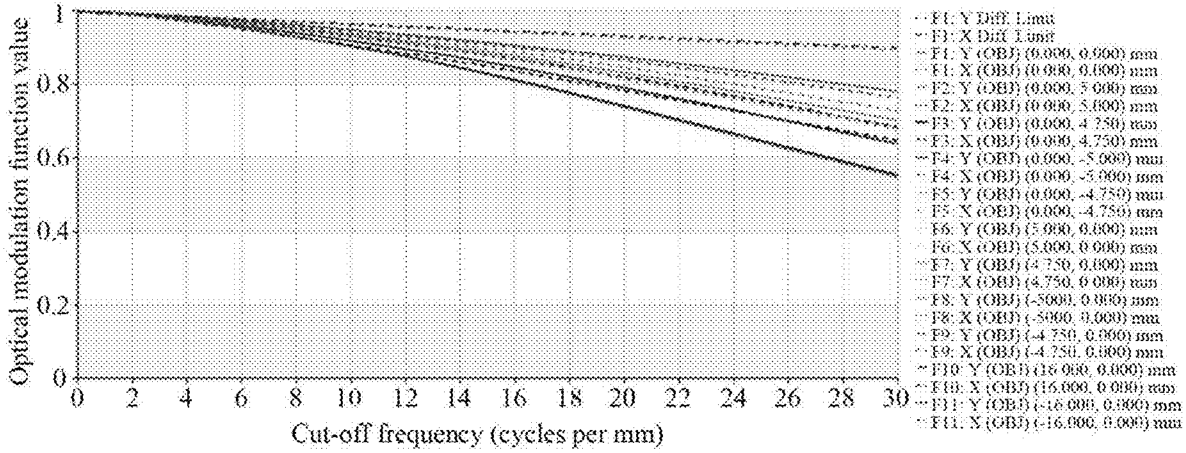
FIG. 8 illustrates a modulation transfer function curve of the visual optical system according to Embodiment 2 of the present disclosure.

A visual optical system according to Embodiment 2 of the present disclosure is described below with reference to FIGS. 6-8. FIG. 6 is a schematic structural diagram of the visual optical system in Embodiment 2. FIG. 7 is a schematic structural diagram of a second optical system in Embodiment 2. FIG. 8 illustrates a modulation transfer function (MTF) curve of the visual optical system in Embodiment 2.

As shown in FIGS. 6 and 7, the visual optical system may include the first optical system 100 and the second optical system 200, the second optical system 200 being positioned on a side of the first optical system 100 that is away-from away from a human eye. The first optical system 100 includes, sequentially along a first optical axis from the near-eye side to the away-from-eye side, a first lens L1, a reflective polarizing element RP, a quarter-wave plate QWP, a second lens L2 and a third lens L3. The first optical system 100 may further be disposed with a partially reflective layer disposed on a side surface of the second lens L2 or the third lens L3. The second optical system 200 includes, sequentially along a second optical axis from the near-eye side to the away-from-eye side, a first lens element E1, a second lens element E2, a third lens element E3, a fourth lens element E4, a fifth lens element E5 and a sixth lens element E6. A diaphragm STO may be disposed between the first optical system 100 and the first lens element E1.

Here, the first lens L1 has a positive refractive power, a near-eye-side surface S1' of the first lens L1 is a concave surface, and an away-from-eye-side surface S2' of the first lens L1 is a convex surface. The reflective polarizing element RP has a near-eye-side surface and an away-from-eye-side surface, and the near-eye-side surface of the reflective polarizing element RP is attached to the away-from-eye-side surface S2' of the first lens L1. The quarter-wave plate QWP has a near-eye-side surface and an away-from-eye-side surface, and the near-eye-side surface of the quarter-wave plate QWP is attached to the away-from-eye-side surface of the reflective polarizing element RP. The second lens L2 has a negative refractive power, a near-eye-side surface S3' of the second lens L2 is a concave surface, and an away-from-eye-side surface S4' of the second lens L2 is a flat surface. The third lens L3 has a positive refractive power, a near-eye-side surface S5' of the third lens L3 is a flat surface, and an away-from-eye-side surface S6' of the third lens L3 is a convex surface.

Here, the first lens element E1 has a negative refractive power, a near-eye-side surface S1 of the first lens element E1 is a concave surface, and an away-from-eye-side surface S2 of the first lens element E1 is a convex surface. The second lens element E2 has a positive refractive power, a near-eye-side surface S3 of the second lens element E2 is a convex surface, and an away-from-eye-side surface S4 of the second lens element E2 is a concave surface. The third lens element E3 has a positive refractive power, a near-eye-side surface S5 of the third lens element E3 is a convex surface, and an away-from-eye-side surface S6 of the third lens element E3 is a convex surface. The fourth lens element E4 has a negative refractive power, a near-eye-side surface S7 of the fourth lens element E4 is a concave surface, and an away-from-eye-side surface S8 of the fourth lens element E4 is a convex surface. The fifth lens element E5 has a positive refractive power, a near-eye-side surface S9 of the fifth lens element E5 is a convex surface, and an away-from-eye-side surface S10 of the fifth lens element E5 is a convex surface. The sixth lens element E6 has a positive refractive power, a near-eye-side surface S11 of the sixth lens element E6 is a concave surface, and an away-from-eye-side surface S12 of the sixth lens element E6 is a convex surface. An optical filter E7 has a near-eye-side surface S13 and an away-from-eye-side surface S14. Light from an object sequentially passes through the surfaces S1-S14, and finally forms an image on an image plane S15.

Table 3 is a table showing basic parameters of the visual optical system in Embodiment 2. Here, the units of a radius of curvature and a thickness/distance are millimeters (mm).

TABLE 3

| surface number | surface type | radius of curvature | thickness/ distance | material refractive index | material abbe number | conic coefficient |
|---|---|---|---|---|---|---|
| near-eye side | spherical | infinite | 12.0000 | | | |
| S1' | aspheric | −500.0000 | 3.8000 | 1.536 | 55.92 | 0.0000 |
| S2'/RP | aspheric | −80.0000 | 0.1000 | 1.490 | 56.00 | 0.0000 |
| QWP | aspheric | −80.0000 | 0.1000 | 1.490 | 56.00 | |
| | aspheric | −80.0000 | 0.2500 | | | |
| S3' | aspheric | −67.2561 | 0.8998 | 1.620 | 23.52 | 0.0000 |
| S4' | spherical | infinite | 0.0000 | | | |
| S5' | spherical | infinite | 8.2802 | 1.536 | 55.92 | |
| S6' | aspheric | −36.6342 | 0.0000 Tx/Ty | | | 0.0000 |
| STO | spherical | infinite | 0.0324 | | | |
| S1 | aspheric | −0.8971 | 0.1139 | 1.537 | 56.14 | 0.0000 |
| S2 | aspheric | −3.9439 | 0.0489 | | | 0.0000 |
| S3 | aspheric | 0.9196 | 0.2128 | 1.537 | 56.14 | 0.0000 |
| S4 | aspheric | 3.2276 | 0.0851 | | | 0.0000 |
| S5 | aspheric | 1.2377 | 0.2717 | 1.537 | 56.14 | 0.0000 |
| S6 | aspheric | −8.3393 | 0.2070 | | | 0.0000 |
| S7 | aspheric | −0.3149 | 0.1515 | 1.647 | 19.24 | −1.0000 |
| S8 | aspheric | −0.4692 | 0.0100 | | | −1.0000 |
| S9 | aspheric | 0.8951 | 0.4377 | 1.537 | 56.14 | 0.0000 |
| S10 | aspheric | −1.8690 | 0.3224 | | | 0.0000 |
| S11 | aspheric | −0.4227 | 0.5605 | 1.647 | 19.24 | −1.0000 |
| S12 | aspheric | −0.4125 | 0.0100 | | | −1.0000 |
| S13 | spherical | infinite | 0.2100 | 1.510 | 64.17 | |
| S14 | spherical | infinite | 0.4700 | | | |
| S15 | spherical | infinite | 0.0000 | | | |

In this embodiment, the near-eye-side surface and the away-from-eye-side surface of the first lens L1, the near-eye-side surface of the second lens L2, the away-from-eye-side surface of the third lens L3, and the near-eye-side surfaces and the away-from-eye-side surfaces of the first to sixth lens elements E1-E6 are all aspheric surfaces. Table 4 shows the high-order coefficients $A_4$, $A_6$, $A_8$, $A_{10}$, $A_{12}$, $A_{14}$ and $A_{16}$ applicable to the aspheric surfaces S1'-S3', S6' and S1-S12 in Embodiment 2.

TABLE 4

| surface number | $A_4$ | $A_6$ | $A_8$ | $A_{10}$ | $A_{12}$ | $A_{14}$ | $A_{16}$ |
|---|---|---|---|---|---|---|---|
| S1' | −1.1214E+00 | −3.3129E−01 | −9.6209E−02 | −2.3497E−02 | −1.5886E−02 | 2.7230E−04 | −2.1414E−03 |
| S2' | −5.2510E−01 | 1.3365E−01 | −3.2642E−02 | 1.2198E−02 | −5.6791E−03 | 1.7956E−03 | −2.8782E−04 |
| S3' | −1.7966E−01 | 1.0059E−01 | 1.7702E−02 | −1.4597E−02 | 2.2334E−03 | −3.3570E−03 | 6.0729E−04 |
| S6' | 6.3214E−03 | −1.1485E−02 | −1.2245E−03 | 0.0000E+00 | 0.0000E+00 | 0.0000E+00 | 0.0000E+00 |
| S1 | 2.0526E−01 | −2.9567E−02 | 5.2881E−03 | −1.1014E−03 | 2.9057E−04 | −9.9076E−05 | 1.1858E−04 |
| S2 | 1.3376E−01 | −1.2826E−03 | 4.8239E−03 | 7.0923E−04 | 4.9618E−06 | 1.1873E−04 | 2.7411E−05 |
| S3 | −6.9170E−02 | 3.2731E−03 | −1.8313E−03 | 8.1852E−04 | −5.2455E−05 | −6.6983E−05 | −3.0012E−05 |
| S4 | −1.3702E−01 | 1.4958E−02 | −2.7438E−03 | 1.6981E−04 | 1.9994E−04 | −1.6533E−05 | −1.6581E−04 |
| S5 | −1.2304E−01 | 8.3106E−03 | −2.1731E−03 | 1.6432E−04 | −9.5161E−05 | 2.1381E−04 | −5.3220E−05 |
| S6 | −1.5720E−01 | 1.0676E−03 | 1.2574E−03 | 1.0963E−03 | −5.1214E−04 | 8.1594E−06 | 3.0593E−05 |
| S7 | 1.4872E−01 | 4.9153E−04 | 5.2141E−03 | −2.3034E−03 | 5.1327E−04 | 8.9561E−05 | −4.3310E−05 |
| S8 | 1.9350E−01 | 8.9586E−03 | 3.5400E−03 | −2.0480E−03 | 4.5103E−04 | 1.4897E−04 | 2.8094E−05 |
| S9 | −7.0870E−01 | 2.0122E−02 | −2.0440E−02 | −7.6845E−03 | −3.5196E−03 | −9.8084E−04 | −5.2444E−05 |
| S10 | −2.2359E−01 | 7.7737E−02 | −1.1219E−02 | −1.3050E−02 | 3.5715E−03 | −4.4385E−04 | 1.3809E−04 |
| S11 | 4.7181E−01 | −3.6987E−02 | −2.0155E−02 | −1.0429E−02 | 1.2316E−03 | −4.6106E−03 | −4.7763E−04 |
| S12 | 1.1006E+00 | −1.9501E−01 | 3.4503E−03 | −1.7875E−02 | −8.5256E−03 | −6.6083E−03 | 2.1952E−03 |

Embodiment 3

Figure 9:
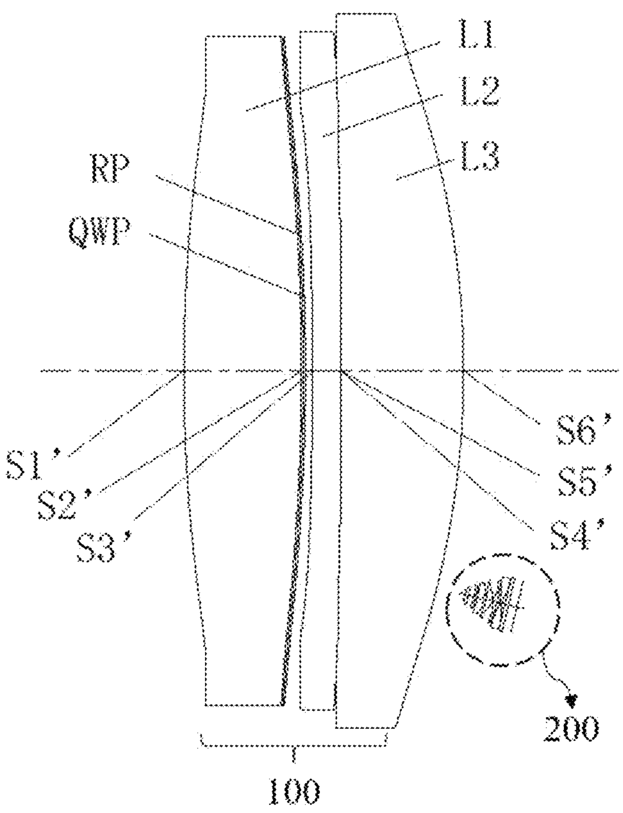
FIG. 9 is a schematic structural diagram of a visual optical system according to Embodiment 3 of the present disclosure.
Figure 10:
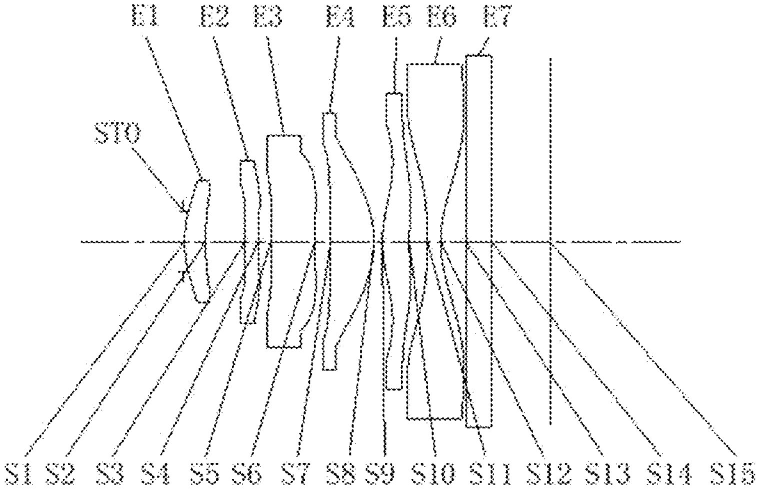
FIG. 10 is a schematic structural diagram of a second optical system according to Embodiment 3 of the present disclosure.
Figure 11:
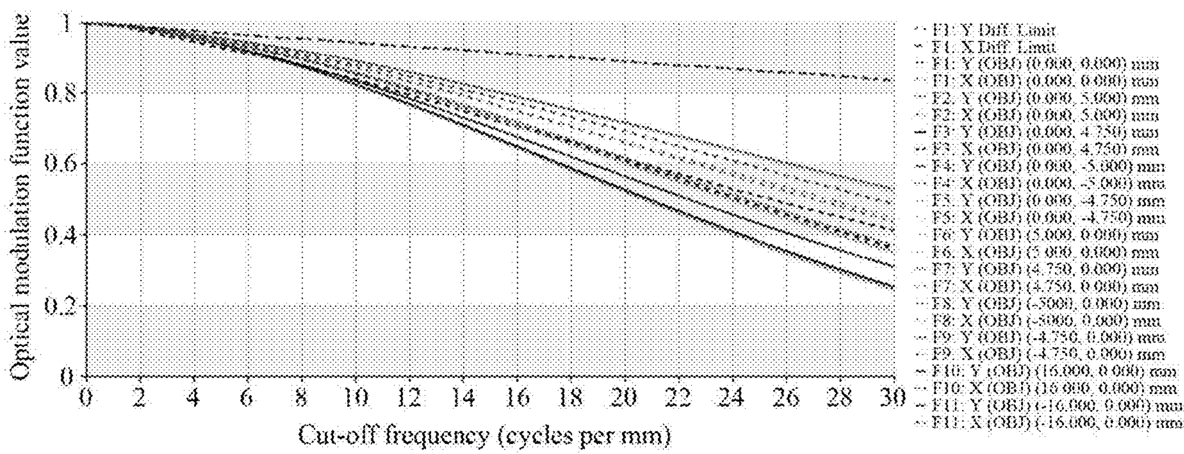
FIG. 11 illustrates a modulation transfer function curve of the visual optical system according to Embodiment 3 of the present disclosure.

A visual optical system according to Embodiment 3 of the present disclosure is described below with reference to FIGS. 9-11. FIG. 9 is a schematic structural diagram of the visual optical system in Embodiment 3. FIG. 10 is a schematic structural diagram of a second optical system in Embodiment 3. FIG. 11 illustrates a modulation transfer function (MTF) curve of the visual optical system in Embodiment 3.

As shown in FIGS. 9 and 10, the visual optical system may include a first optical system 100 and a second optical system 200, the second optical system 200 is positioned on a side of the first optical system 100 that is away-from away from a human eye. The first optical system 100 includes, sequentially along a first optical axis from the near-eye side to the away-from-eye side, a first lens L1, a reflective polarizing element RP, a quarter-wave plate QWP, a second lens L2 and a third lens L3. The first optical system 100 may further be disposed with a partially reflective layer disposed on a side surface of the second lens L2 or the third lens L3. The second optical system 200 includes, sequentially along a second optical axis from the near-eye side to the away-from-eye side, a first lens element E1, a second lens element E2, a third lens element E3, a fourth lens element E4, a fifth lens element E5 and a sixth lens element E6. A diaphragm STO may be disposed between the first optical system 100 and the first lens element E1.

Here, the first lens L1 has a positive refractive power, a near-eye-side surface S1' of the first lens L1 is a convex surface, and an away-from-eye-side surface S2' of the first lens L1 is a convex surface. The reflective polarizing element RP has a near-eye-side surface and an away-from-eye-side surface, and the near-eye-side surface of the reflective polarizing element RP is attached to the away-from-eye-side surface S2' of the first lens L1. The quarter-wave plate QWP has a near-eye-side surface and an away-from-eye-side surface, and the near-eye-side surface of the quarter-wave plate QWP is attached to the away-from-eye-side surface of the reflective polarizing element RP. The second lens L2 has a negative refractive power, a near-eye-side surface S3' of the second lens L2 is a concave surface, and an away-from-eye-side surface S4' of the second lens L2 is a concave surface. The third lens L3 has a positive refractive power, a near-eye-side surface S5' of the third lens L3 is a convex surface, and an away-from-eye-side surface S6' of the third lens L3 is a convex surface.

Here, the first lens element E1 has a positive refractive power, a near-eye-side surface S1 of the first lens element E1 is a convex surface, and an away-from-eye-side surface S2 of the first lens element E1 is a concave surface. The second lens element E2 has a negative refractive power, a near-eye-side surface S3 of the second lens element E2 is a convex surface, and an away-from-eye-side surface S4 of the second lens element E2 is a concave surface. The third lens element E3 has a negative refractive power, a near-eye-side surface S5 of the third lens element E3 is a convex surface, and an away-from-eye-side surface S6 of the third lens element E3 is a concave surface. The fourth lens element E4 has a positive refractive power, a near-eye-side surface S7 of the fourth lens element E4 is a concave surface, and an away-from-eye-side surface S8 of the fourth lens element E4 is a convex surface. The fifth lens element E5 has a positive refractive power, a near-eye-side surface S9 of the fifth lens element E5 is a convex surface, and an away-from-eye-side surface S10 of the fifth lens element E5 is a concave surface. The sixth lens element E6 has a negative refractive power, a near-eye-side surface S11 of the sixth lens element E6 is a concave surface, and an away-from-eye-side surface S12 of the sixth lens element E6 is a concave surface. An optical filter E7 has a near-eye-side surface S13 and an away-from-eye-side surface S14. Light from an object sequentially passes through the surfaces S1-S14, and finally forms an image on an image plane S15.

Table 5 is a table showing basic parameters of the visual optical system in Embodiment 3. Here, the units of a radius of curvature and a thickness/distance are millimeters (mm).

TABLE 5

| surface number | surface type | radius of curvature | thickness/ distance | material: refractive index | material: abbe number | conic coefficient |
|---|---|---|---|---|---|---|
| near-eye side | spherical | infinite | 12.0000 | | | |
| S1' | aspheric | 79.3621 | 6.6570 | 1.536 | 55.92 | 0.0000 |
| S2'/RP | aspheric | −118.3395 | 0.1000 | 1.490 | 56.00 | 0.0000 |
| QWP | aspheric | −118.3395 | 0.1000 | 1.490 | 56.00 | |
| | aspheric | −118.3395 | 0.2500 | | | |
| S3' | aspheric | −168.5771 | 1.3214 | 1.536 | 55.92 | 0.0000 |
| S4' | aspheric | 560.8906 | 0.0000 | | | 0.0000 |
| S5' | aspheric | 560.8906 | 7.6755 | 1.536 | 55.92 | 0.0000 |
| S6' | aspheric | −45.5881 | 0.0000 Tx/Ty | | | 0.0000 |
| STO | spherical | infinite | 0.0100 | | | |
| S1 | aspheric | 0.9693 | 0.1629 | 1.581 | 35.51 | 0.0000 |
| S2 | aspheric | 2.0821 | 0.3103 | | | 0.0000 |
| S3 | aspheric | 5.5307 | 0.1039 | 1.647 | 19.24 | 0.0000 |
| S4 | aspheric | 2.1888 | 0.0989 | | | 0.0000 |
| S5 | aspheric | 3.7165 | 0.3421 | 1.537 | 56.14 | 0.0000 |
| S6 | aspheric | 3.0295 | 0.1273 | | | 0.0000 |
| S7 | aspheric | −3.8677 | 0.3381 | 1.647 | 19.24 | 0.0000 |
| S8 | aspheric | −0.8225 | 0.0619 | | | −1.0000 |
| S9 | aspheric | 0.9314 | 0.2084 | 1.581 | 35.51 | −1.0000 |
| S10 | aspheric | 2.3410 | 0.1397 | | | 0.0000 |
| S11 | aspheric | −5.3611 | 0.1000 | 1.647 | 19.24 | 0.0000 |
| S12 | aspheric | 0.8655 | 0.1878 | | | −1.0000 |
| S13 | spherical | infinite | 0.2100 | 1.510 | 64.17 | |
| S14 | spherical | infinite | 0.4700 | | | |
| S15 | spherical | infinite | 0.0000 | | | |

In this embodiment, the near-eye-side surfaces and the away-from-eye-side surfaces of the first to third lenses L1-L3 and the near-eye-side surfaces and the away-from-eye-side surfaces of the first to sixth lens elements E1-E6 are all aspheric surfaces. Table 6 shows the high-order coefficients $A_4$, $A_6$, $A_8$, $A_{10}$, $A_{12}$, $A_{14}$ and $A_{16}$ applicable to the aspheric surfaces S1'-S6' and S1-S12 in Embodiment 3.

TABLE 6

| surface number | $A_4$ | $A_6$ | $A_8$ | $A_{10}$ | $A_{12}$ | $A_{14}$ | $A_{16}$ |
|---|---|---|---|---|---|---|---|
| S1' | −4.8524E−01 | −8.1530E−02 | −4.8933E−02 | 1.0052E−02 | −1.1256E−02 | 1.9505E−03 | −8.1676E−04 |
| S2' | 1.3422E−01 | 2.4111E−02 | 2.1013E−04 | −6.2016E−03 | −2.7975E−03 | 4.9328E−04 | 3.3116E−04 |
| S3' | −3.4535E−01 | 1.3235E−02 | 1.3069E−01 | −3.5501E−02 | 3.8362E−03 | 1.7737E−04 | −2.8648E−04 |
| S4' | −9.7724E−01 | 1.2301E−01 | −2.1000E−01 | 6.4941E−02 | −1.6673E−02 | 2.5460E−03 | 1.6000E−03 |

TABLE 6-continued

| surface number | $A_4$ | $A_6$ | $A_8$ | $A_{10}$ | $A_{12}$ | $A_{14}$ | $A_{16}$ |
|---|---|---|---|---|---|---|---|
| S5' | −9.7724E−01 | 1.2301E−01 | −2.1000E−01 | 6.4941E−02 | −1.6673E−02 | 2.5460E−03 | 1.6000E−03 |
| S6' | 6.3214E−03 | −1.1485E−02 | −1.2245E−03 | 0.0000E+00 | 0.0000E+00 | 0.0000E+00 | 0.0000E+00 |
| S1 | 2.3267E−03 | −1.3075E−03 | −5.8430E−04 | −2.0780E−04 | −7.0335E−05 | −1.8075E−05 | −2.5294E−06 |
| S2 | −5.9133E−03 | −2.5102E−03 | −6.4561E−04 | −1.5776E−04 | −3.9191E−05 | −9.4142E−06 | −8.9190E−07 |
| S3 | −1.1167E−01 | −1.2156E−02 | −3.2770E−03 | −9.0737E−05 | −2.7889E−05 | 9.7654E−05 | 1.2367E−05 |
| S4 | −1.5090E−01 | 1.0650E−02 | 1.0501E−03 | 2.4625E−03 | −5.5371E−05 | 1.8208E−04 | −6.3018E−05 |
| S5 | −1.9862E−01 | 6.6025E−02 | −1.2049E−02 | 1.9687E−03 | −1.1817E−03 | 6.1477E−04 | −2.4130E−04 |
| S6 | −5.3323E−01 | 5.0734E−02 | 2.7606E−02 | 5.3679E−03 | −3.4526E−03 | −1.8291E−03 | −7.4068E−04 |
| S7 | −1.0832E−01 | −6.3608E−02 | 3.0338E−02 | −4.7737E−03 | 1.8475E−03 | 1.8688E−04 | −9.8671E−05 |
| S8 | 4.1893E−01 | −1.9647E−02 | −9.7728E−03 | −4.7023E−03 | 2.1359E−03 | 7.4384E−04 | −1.0506E−03 |
| S9 | −1.8787E+00 | 5.1801E−01 | −1.6086E−01 | 3.5187E−02 | −4.8380E−03 | 6.5353E−04 | −1.2525E−03 |
| S10 | −1.0380E+00 | 2.2344E−01 | −1.2424E−01 | 7.4030E−02 | −3.0460E−02 | 1.6937E−02 | −5.7711E−03 |
| S11 | 1.7828E−01 | 6.7874E−02 | −8.5315E−02 | 5.5890E−02 | −2.2756E−02 | 1.1626E−02 | −7.0958E−03 |
| S12 | −2.3582E+00 | 5.6046E−01 | −1.4813E−01 | 3.2418E−02 | −1.1432E−02 | 1.0075E−02 | −4.0129E−03 |

Embodiment 4

Figure 12:
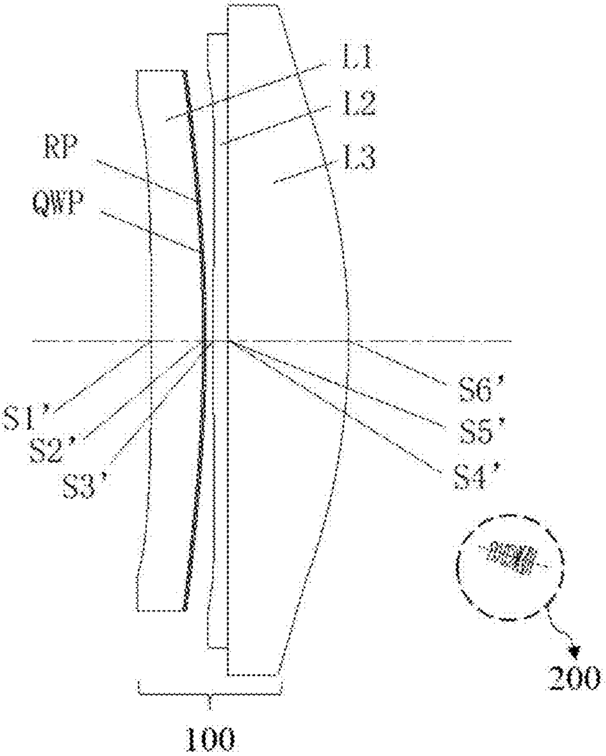
FIG. 12 is a schematic structural diagram of a visual optical system according to Embodiment 4 of the present disclosure.
Figure 13:
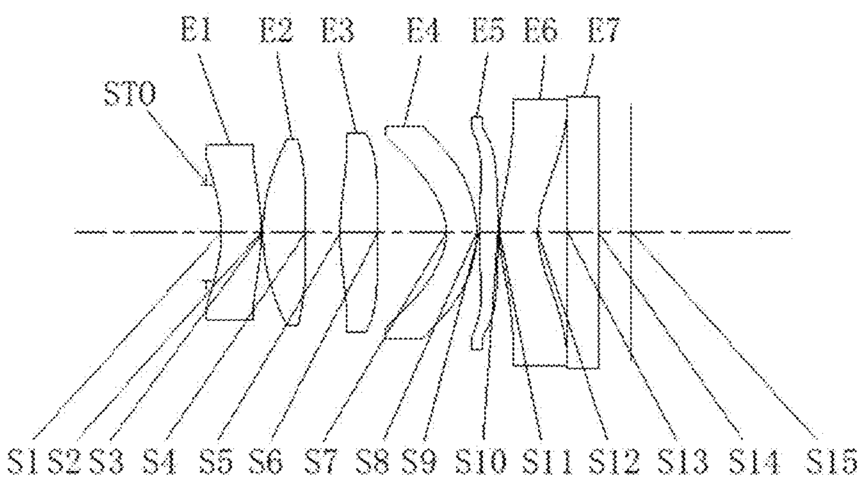
FIG. 13 is a schematic structural diagram of a second optical system according to Embodiment 4 of the present disclosure.
Figure 14:
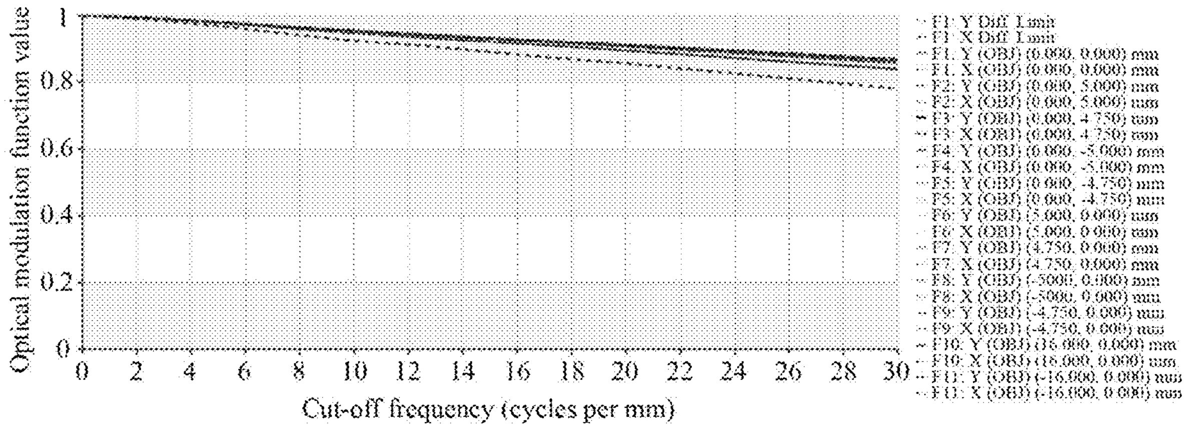
FIG. 14 illustrates a modulation transfer function curve of the visual optical system according to Embodiment 4 of the present disclosure.

A visual optical system according to Embodiment 4 of the present disclosure is described below with reference to FIGS. 12-14. FIG. 12 is a schematic structural diagram of the visual optical system in Embodiment 4. FIG. 13 is a schematic structural diagram of a second optical system in Embodiment 4. FIG. 14 illustrates a modulation transfer function (MTF) curve of the visual optical system in Embodiment 4.

As shown in FIGS. 12 and 13, the visual optical system may include a first optical system 100 and a second optical system 200, the second optical system 200 being positioned on a side of the first optical system 100 that is away-from away from a human eye. The first optical system 100 includes, sequentially along a first optical axis from the near-eye side to the away-from-eye side, a first lens L1, a reflective polarizing element RP, a quarter-wave plate QWP, a second lens L2 and a third lens L3. The first optical system 100 may further be disposed with a partially reflective layer disposed on a side surface of the second lens L2 or the third lens L3. The second optical system 200 includes, sequentially along a second optical axis from the near-eye side to the away-from-eye side, a first lens element E1, a second lens element E2, a third lens element E3, a fourth lens element E4, a fifth lens element E5 and a sixth lens element E6. A diaphragm STO may be disposed between the first optical system 100 and the first lens element E1.

Here, the first lens L1 has a positive refractive power, a near-eye-side surface S1' of the first lens L1 is a concave surface, and an away-from-eye-side surface S2' of the first lens L1 is a convex surface. The reflective polarizing element RP has a near-eye-side surface and an away-from-eye-side surface, and the near-eye-side surface of the reflective polarizing element RP is attached to the away-from-eye-side surface S2' of the first lens L1. The quarter-wave plate QWP has a near-eye-side surface and an away-from-eye-side surface, and the near-eye-side surface of the quarter-wave plate QWP is attached to the away-from-eye-side surface of the reflective polarizing element RP. The second lens L2 has a positive refractive power, a near-eye-side surface S3' of the second lens L2 is a convex surface, and an away-from-eye-side surface S4' of the second lens L2 is a flat surface. The third lens L3 has a positive refractive power, a near-eye-side surface S5' of the third lens L3 is a flat surface, and an away-from-eye-side surface S6' of the third lens L3 is a convex surface.

Here, the first lens element E1 has a negative refractive power, a near-eye-side surface S1 of the first lens element E1 is a concave surface, and an away-from-eye-side surface S2 of the first lens element E1 is a convex surface. The second lens element E2 has a positive refractive power, a near-eye-side surface S3 of the second lens element E2 is a convex surface, and an away-from-eye-side surface S4 of the second lens element E2 is a concave surface. The third lens element E3 has a positive refractive power, a near-eye-side surface S5 of the third lens element E3 is a convex surface, and an away-from-eye-side surface S6 of the third lens element E3 is a convex surface. The fourth lens element E4 has a negative refractive power, a near-eye-side surface S7 of the fourth lens element E4 is a concave surface, and an away-from-eye-side surface S8 of the fourth lens element E4 is a convex surface. The fifth lens element E5 has a positive refractive power, a near-eye-side surface S9 of the fifth lens element E5 is a convex surface, and an away-from-eye-side surface S10 of the fifth lens element E5 is a concave surface. The sixth lens element E6 has a negative refractive power, a near-eye-side surface S11 of the sixth lens element E6 is a convex surface, and an away-from-eye-side surface S12 of the sixth lens element E6 is a concave surface. An optical filter E7 has a near-eye-side surface S13 and an away-from-eye-side surface S14. Light from an object sequentially passes through the surfaces S1-S14, and finally forms an image on an image plane S15.

Table 7 is a table showing basic parameters of the visual optical system in Embodiment 4. Here, the units of a radius of curvature and a thickness/distance are millimeters (mm).

TABLE 7

| surface number | surface type | radius of curvature | thickness/ distance | material | | conic coefficient |
|---|---|---|---|---|---|---|
| | | | | refractive index | abbe number | |
| near-eye side | spherical | infinite | 12.0000 | | | |
| S1' | aspheric | −500.0000 | 3.3550 | 1.536 | 55.92 | 0.0000 |
| S2'/RP | aspheric | −109.7362 | 0.1000 | 1.490 | 56.00 | 0.0000 |
| QWP | aspheric | −109.7362 | 0.1000 | 1.490 | 56.00 | |
| | aspheric | −109.7362 | 0.2500 | | | |
| S3' | aspheric | 1118.8427 | 0.9396 | 1.536 | 55.92 | 0.0000 |
| S4' | spherical | infinite | 0.0000 | | | |
| S5' | spherical | infinite | 8.3494 | 1.536 | 55.92 | |
| S6' | aspheric | −43.3262 | 0.0000 Tx/Ty | | | 0.0000 |
| STO | spherical | infinite | 0.0304 | | | |
| S1 | aspheric | −0.9072 | 0.2682 | 1.647 | 19.24 | 0.0000 |
| S2 | aspheric | −1.2855 | 0.0100 | | | 0.0000 |
| S3 | aspheric | 1.1010 | 0.2875 | 1.537 | 56.14 | 0.0000 |
| S4 | aspheric | 9.7297 | 0.2344 | | | 0.0000 |
| S5 | aspheric | 1.7455 | 0.2542 | 1.537 | 56.14 | 0.0000 |
| S6 | aspheric | −10.6372 | 0.4570 | | | 0.0000 |
| S7 | aspheric | −0.3751 | 0.2054 | 1.647 | 19.24 | −1.0000 |
| S8 | aspheric | −0.7200 | 0.0155 | | | −1.0000 |
| S9 | aspheric | 3.7150 | 0.1263 | 1.647 | 19.24 | 0.0000 |
| S10 | aspheric | −0.9098 | 0.0100 | | | −1.0000 |
| S11 | aspheric | 0.9057 | 0.2542 | 1.537 | 56.14 | −1.0000 |
| S12 | aspheric | 0.5726 | 0.2000 | | | −1.0000 |
| S13 | spherical | infinite | 0.2100 | 1.510 | 64.17 | |
| S14 | spherical | infinite | 0.2211 | | | |
| S15 | spherical | infinite | 0.0000 | | | |

In this embodiment, the near-eye-side surface and the away-from-eye-side surface of the first lens L1, the near-eye-side surface of the second lens L2, the away-from-eye-side surface of the third lens L3, and the near-eye-side surfaces and the away-from-eye-side surfaces of the first to sixth lens elements E1-E6 are all aspheric surfaces. Table 8 shows the high-order coefficients $A_4$, $A_6$, $A_8$, $A_{10}$, $A_{12}$, $A_{14}$ and $A_{16}$ applicable to the aspheric surfaces S1'-S3', S6' and S1-S12 in Embodiment 4.

TABLE 4

| surface number | $A_4$ | $A_6$ | $A_8$ | $A_{10}$ | $A_{12}$ | $A_{14}$ | $A_{16}$ |
|---|---|---|---|---|---|---|---|
| S1' | −9.4583E−01 | −1.9555E−01 | −1.0082E−01 | 4.1586E−02 | −1.3268E−02 | −2.4985E−03 | −1.9133E−03 |
| S2' | 1.4170E−01 | 5.7186E−02 | −4.7677E−03 | −6.3182E−03 | −6.1732E−04 | 9.3834E−04 | −1.7605E−04 |
| S3' | −6.2249E−01 | −3.1748E−02 | 5.9938E−02 | 2.7461E−03 | −5.0228E−03 | 4.1308E−03 | 4.9000E−03 |
| S6' | 6.3214E−03 | −1.1485E−02 | −1.2245E−03 | 0.0000E+00 | 0.0000E+00 | 0.0000E+00 | 0.0000E+00 |
| S1 | 2.6922E−01 | −6.5309E−03 | 6.5483E−03 | 7.0913E−07 | 7.5697E−05 | 1.6836E−04 | 5.4661E−05 |
| S2 | 1.6352E−01 | −8.2064E−03 | 1.0205E−03 | −1.5568E−04 | −9.4174E−05 | 4.6998E−05 | 9.0757E−06 |
| S3 | −2.3583E−02 | 1.9239E−04 | −6.1602E−04 | 2.1445E−05 | −5.8011E−06 | 2.5308E−05 | −4.4420E−06 |
| S4 | −7.0578E−02 | 7.4692E−03 | −1.1089E−03 | 2.3816E−05 | −2.2994E−05 | 7.2955E−06 | 2.0594E−05 |
| S5 | −7.7468E−02 | −5.3639E−04 | 9.5329E−05 | −1.2750E−04 | 1.1351E−05 | 2.2282E−05 | 6.6044E−07 |
| S6 | −5.3270E−02 | −7.3123E−03 | 3.7737E−04 | −2.4031E−04 | −4.7558E−05 | 1.9073E−05 | −8.8679E−07 |
| S7 | 1.5556E−01 | −1.6048E−02 | 9.1178E−03 | −2.4387E−03 | −1.7633E−04 | 1.1447E−04 | −9.9645E−05 |
| S8 | −1.2256E−02 | 3.3919E−02 | 1.4764E−02 | −6.9962E−04 | 5.6132E−04 | 3.5281E−04 | −9.1916E−05 |
| S9 | −4.9514E−01 | 1.2081E−02 | 7.4383E−03 | −4.0352E−03 | 2.7761E−03 | −5.4058E−04 | −2.1281E−04 |
| S10 | 3.5411E−01 | −3.5180E−02 | 6.2496E−03 | −7.5297E−03 | 4.6737E−03 | −5.4497E−04 | −5.8916E−04 |
| S11 | −1.7596E+00 | 4.1270E−01 | −1.0728E−01 | 3.5434E−02 | −1.9493E−02 | 1.4959E−02 | −5.8271E−03 |
| S12 | −3.5739E+00 | 6.4909E−01 | −2.0739E−01 | 9.6065E−02 | −2.7695E−02 | 1.3137E−02 | −9.2120E−03 |

Table 9 shows the values of f, f1', f2', f3', f1, f2, f3, f4, f5, f6, Tx and Ty in each of Embodiments 1-4. Here, the units of the parameters shown in Table 9 are all millimeters, and Tx and Ty can be measured according to the marking method described in FIG. 1.

TABLE 9

| Parameter | Embodiment 1 | 2 | 3 | 4 |
|---|---|---|---|---|
| f | 1.74 | 1.17 | 1.83 | 1.68 |
| f1' | 92.94 | 176.99 | 89.61 | 261.32 |
| f2' | −460.31 | −108.52 | −241.49 | 2085.81 |
| f3' | 84.00 | 68.30 | 78.95 | 80.77 |
| f1 | 3.06 | −2.19 | 2.96 | −6.61 |
| f2 | 5.27 | 2.32 | −5.67 | 2.29 |
| f3 | −2.03 | 2.03 | −36.97 | 2.81 |
| f4 | −8.86 | −2.41 | 1.55 | −1.58 |
| f5 | 1.00 | 1.19 | 2.53 | 1.14 |
| f6 | 5.68 | 1.17 | −1.15 | −3.96 |
| Tx | 8.30 | 0.00 | 0.00 | 10.00 |
| Ty | 17.08 | 12.00 | 12.00 | 12.00 |

In summary, Table 10 shows the values of conditional expressions in each of Embodiments 1-4.

TABLE 10

| Conditional expression | Embodiment 1 | 2 | 3 | 4 |
|---|---|---|---|---|
| (f3'/TD')/(\|f1\|/TD) | 4.63 | 5.62 | 3.30 | 1.98 |
| f5/f | 0.57 | 1.02 | 1.38 | 0.68 |
| f1'/R2' | −0.69 | −2.21 | −0.76 | −2.38 |
| R3'/f2' | 0.43 | 0.62 | 0.70 | 0.54 |
| (CT1' + CTR + CTQ)/f | 3.36 | 3.42 | 3.75 | 2.12 |
| (CT2' + CT3')/f | 4.98 | 7.85 | 4.92 | 5.53 |
| f4/f2 | −1.68 | −1.04 | −0.27 | −0.69 |
| R1/R2 | 0.37 | 0.23 | 0.47 | 0.71 |
| R5/R4 | 0.69 | 0.38 | 1.70 | 0.18 |
| (f3'/R6')/(f1/R1) | −0.76 | −0.76 | −0.57 | −0.26 |
| (N3'/N1) × f | 1.62 | 1.17 | 1.78 | 1.57 |
| V3'/(V1 + V2) | 1.45 | 0.50 | 1.02 | 0.74 |
| (V4/V5) × (CT4/CT5) | 0.98 | 0.12 | 0.88 | 1.63 |
| TD/f | 1.46 | 2.07 | 1.09 | 1.26 |
| TD'/CT3' | 2.10 | 1.62 | 2.10 | 1.57 |
| R12/f6 | −0.70 | −0.35 | −0.76 | −0.14 |

The foregoing is only a description for the preferred embodiments of the present disclosure and the applied technical principles. It should be appreciated by those skilled in the art that the inventive scope of the present disclosure is not limited to the technical solution formed by the particular combination of the above technical features. The inventive scope should also cover other technical solutions formed by any combination of the above technical features or equivalent features thereof without departing from the concept of the present disclosure, for example, technical solutions formed by replacing the features disclosed in the present disclosure with (but not limited to) technical features with similar functions.

What is claimed is:

1. A visual optical system, comprising: a first optical system and a second optical system, wherein the first optical system comprises, sequentially along a first optical axis from a first side to a second side, a first lens having a positive refractive power, a reflective polarizing element, a quarter-wave plate, a second lens having a refractive power, and a third lens having a positive refractive power, and the second optical system comprises, sequentially along a second optical axis from the first side to the second side, a first lens element having a refractive power;

a second lens element having a refractive power;

a third lens element having a refractive power;

a fourth lens element having a refractive power;

a fifth lens element having a positive refractive power; and a sixth lens element having a refractive power, wherein a number of lens elements in the second optical system is 6, and an effective focal length f3' of the third lens, a distance TD' from a first-side surface of the first lens to a second-side surface of the third lens on the first optical axis, an effective focal length f1 of the first lens element, and a distance TD from a first-side surface of the first lens element to a second-side surface of the sixth lens element on the second optical axis satisfy: $1.9<(f3'/TD')/(|f1|/TD)<5.7$.

2. The visual optical system according to claim 1, wherein the effective focal length f3' of the third lens, a radius of curvature R6' of the second-side surface of the third lens, the effective focal length f1 of the first lens element, and a radius of curvature R1 of the first-side surface of the first lens element satisfy: $-0.8<(f3'/R6')/(f1/R1)<-0.2$.

3. The visual optical system according to claim 1, wherein a refractive index N3' of the third lens, a refractive index N1 of the first lens element, and a total effective focal length f of the visual optical system satisfy: $1.1\ mm<(N3'/N1)\times f<1.8\ mm$.

4. The visual optical system according to claim 1, wherein an abbe number V3' of the third lens, an abbe number V1 of the first lens element, and an abbe number V2 of the second lens element satisfy: $0.4<V3'/(V1+V2)<1.5$.

5. The visual optical system according to claim 1, wherein an effective focal length f1' of the first lens and a radius of curvature R2' of a second-side surface of the first lens satisfy: $-2.4<f1'/R2'<-0.6$.

6. The visual optical system according to claim 1, wherein a radius of curvature R3' of a first-side surface of the second lens and an effective focal length f2' of the second lens satisfy: $0.4<R3'/f2'<0.8$.

7. The visual optical system according to claim 1, a center thickness CT1' of the first lens on the first optical axis, a center thickness CTR of the reflective polarizing element on the first optical axis, a center thickness CTQ of the quarter-wave plate on the first optical axis, and a total effective focal length f of the visual optical system satisfy: $2.1<(CT1'+CTR+CTQ)/f<3.8$.

8. The visual optical system according to claim 1, wherein a center thickness CT2' of the second lens on the first optical axis, a center thickness CT3' of the third lens on the first optical axis, and a total effective focal length f of the visual optical system satisfy: $4.9<(CT2'+CT3')/f<7.9$.

9. The visual optical system according to claim 1, the distance TD' from the first-side surface of the first lens to the second-side surface of the third lens on the first optical axis and a center thickness CT3' of the third lens on the first optical axis satisfy: $1.5<TD'/CT3'<2.2$.

10. The visual optical system according to claim 1, wherein an effective focal length f5 of the fifth lens element and a total effective focal length f of the visual optical system satisfy: $0.5<f5/f<1.4$.

11. The visual optical system according to claim 1, wherein an effective focal length f4 of the fourth lens element and an effective focal length f2 of the second lens element satisfy: $-1.7<f4/f2<-0.2$.

12. The visual optical system according to claim 1, wherein a radius of curvature R1 of the first-side surface of the first lens element and a radius of curvature R2 of the second-side surface of the first lens element satisfy: $0.2<R1/R2<0.8$.

13. The visual optical system according to claim 1, wherein a radius of curvature R5 of a first-side surface of the third lens element and a radius of curvature R4 of a second-side surface of the second lens element satisfy: $0.1<R5/R4<1.8$.

14. The visual optical system according to claim 1, wherein a center thickness CT4 of the fourth lens element on the second optical axis, an abbe number V4 of the fourth lens element, a center thickness CT5 of the fifth lens element on the second optical axis, and an abbe number V5 of the fifth lens element satisfy: $0.1<(V4/V5)\times(CT4/CT5)<1.7$.

15. The visual optical system according to claim 1, wherein the distance TD from the first-side surface of the first lens element to the second-side surface of the sixth lens element on the second optical axis and a total effective focal length f of the visual optical system satisfy: $1.0<TD/f<2.1$.

16. The visual optical system according to claim 1, wherein a radius of curvature R12 of the second-side surface of the sixth lens element and an effective focal length f6 of the sixth lens element satisfy: $-0.8<R12/f6<-0.1$.

17. The visual optical system according to claim 1, wherein a display screen is provided at a second side of the visual optical system, and the second optical system is positioned between the first optical system and the display screen.

18. The visual optical system according to claim 1, wherein an angle θ between the second optical axis and the first optical axis satisfies: $0°<\theta<90°$.

* * * * *